E. BROWN.
Rakes.
No. 148,660.      Patented March 17, 1874.
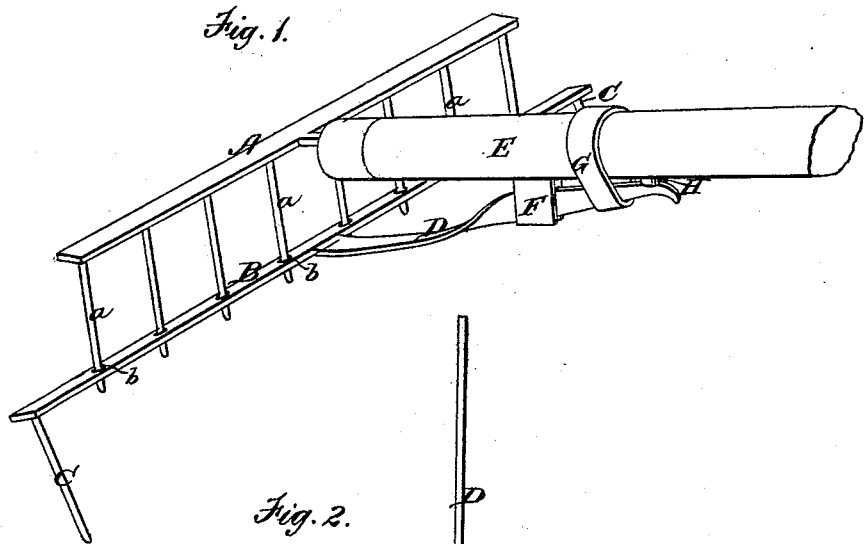
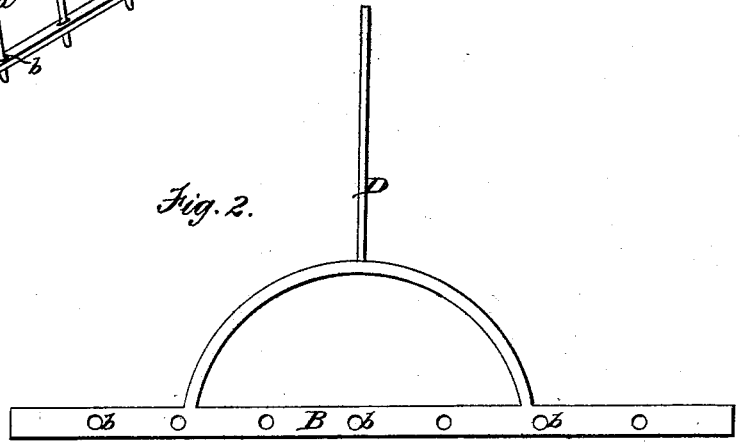
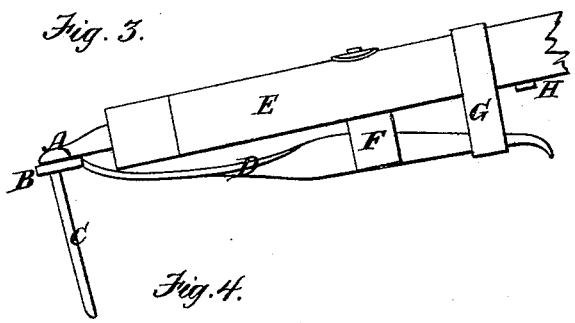
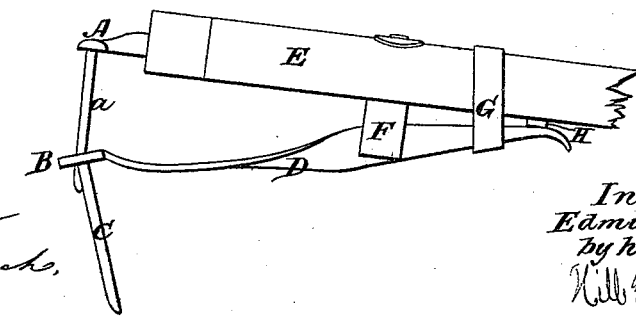
Witnesses.
Inventor
Edmund Brown.
by his Attys.

UNITED STATES PATENT OFFICE.

EDMUND BROWN, OF BURLINGTON, VERMONT, ASSIGNOR TO HIMSELF AND SYLVANUS HUMPHREY, OF SAME PLACE.

IMPROVEMENT IN RAKES.

Specification forming part of Letters Patent No. 148,660, dated March 17, 1874; application filed January 24, 1874.

*To all whom it may concern:*

Be it known that I, EDMUND BROWN, of Burlington, in the county of Chittenden and State of Vermont, have invented a new and useful Improvement in Door-Yard Rakes; and I do hereby declare the following to be a full and exact description of the same, reference being had to the accompanying drawings forming part of this specification, in which—

Figure 1 is a perspective view of my invention; Fig. 2, a plan view, showing a modification of the clearer detached; Fig. 3, a side elevation, showing the position of the clearer when the rake bears on the ground, and Fig. 4 a similar view, showing the position of the clearer when the rake is lifted.

Similar letters of reference in the accompanying drawings denote the same parts.

This invention relates to iron-tooth hand-rakes, such as are commonly used in cleaning leaves and other debris from lawns, door-yards, &c. It is well known that these rakes are continually becoming clogged by the refuse matter which they collect, the teeth being necessarily close together, in order to remove fine leaves, &c., making it necessary for the user to frequently clear the teeth by hand, which is an unpleasant operation, consuming much time, and retarding the work. My invention has for its object to provide an automatically-clearing attachment for iron-tooth door-yard rakes, which shall remove all matter that may be collected between the teeth by simply raising the rake from the ground; and, to this end, it consists of a bar provided with perforations adapted to receive the rake-teeth, and so attached to the rake as to slide downward upon the teeth whenever the rake is raised from the ground, and thereby remove all obstructions. The bar is located parallel with the rake-head, and has a tooth at each end, corresponding with those of the rake, and a lever at its center, extending under the rake-handle, the lever and handle being connected by a spring, and the lever having a suitable fulcrum, the whole being so arranged that when the rake is pressed on the ground the teeth on the bar hold the latter while the rake-teeth pass down through it, and, when the rake is raised, the spring forces the bar downward, all of which I will now proceed to describe.

In the drawings, A represents the rake-head, which is of ordinary construction. B represents a plate or thin bar of metal, somewhat longer than the rake-head A, and provided with perforations $b$, corresponding with the rake-teeth $a$, and adapted to receive the latter, as shown in Fig. 1. At the end of the bar B are teeth C, of such length as to project downward as far as the teeth $a$, when the bar is in the position shown in Fig. 3. D is an arm or lever, attached to the bar B at its center, and projecting, at right angles with it, under the rake-handle E, where it has its fulcrum in a socket, F, projecting from the under side of the handle. G represents a spring composed of a rubber band of sufficient thickness, inclosing the handle and the inner end of the lever D.

It will be seen that the tendency of the spring G is to depress the bar B, and hold it in the position shown in Figs. 1 and 4, the downward movement of the bar being restricted by an adjustable stop, H, in the handle, against which stop the end of the lever D abuts.

In this position the teeth C project below the teeth $a$, and, consequently, are the first to come in contact with the ground, so that a slight pressure on the rake forces the teeth $a$ downward, through the orifices of the bar B, until the latter comes in contact with the head.

The rake is now adapted for operation, the teeth C constituting an extension of the head A. Whenever the teeth become clogged, the operator has only to raise the rake from the ground, when the bar B is forced downward on the teeth, as above stated, and all obstructions are forced out, this operation involving no extra labor, as the rake is naturally lifted after every stroke.

The spring G may be adjusted by moving along the handle, so as to vary its pressure upon the lever; and, being made of rubber, it is durable and inexpensive, and can be replaced at any time without difficulty. This spring admits of some longitudinal play of the lever and bar, so that the latter is not restricted in its movement to the exact arc of a circle.

If desired, a rubber or metallic spring may be arranged between the socket or fulcrum F and the bar B, or in any convenient manner.

The lever D may be bifurcated at its inner end, where it is attached to the bar B, as shown in Fig. 3, this construction being preferable in large rakes. For light rakes the bar may be provided with a metallic spring, attached directly to the rake-handle in place of the lever D and spring G.

The bar B, with its teeth and lever, may all be cast in one piece, of malleable iron, and the holes punched out with a power press. Hence, the whole construction is cheap and simple, and can be applied readily to any ordinary rake.

Having thus described my invention, what I claim as new is—

The combination of the perforated bar B, having teeth C and lever D, the spring G, and the fulcrum or socket F with a garden-rake, substantially as described, for the purpose specified.

EDMUND BROWN.

Witnesses:
H. O. WHEELER,
L. HUMPHREY.